A. H. McGHAN.

PORTABLE SCAFFOLD.

APPLICATION FILED JULY 15, 1911.

Reissued Aug. 15, 1911.

13,281.

3 SHEETS—SHEET 1.

Witnesses:

Ruth C. Fitzhugh

E. E. Warfield

Inventor:

Addison H. McGhan, by

Mauro, Cameron, Lewis & Massie

Attys.

A. H. McGHAN.
PORTABLE SCAFFOLD.
APPLICATION FILED JULY 15, 1911.
Reissued Aug. 15, 1911.
13,281.
3 SHEETS—SHEET 2.
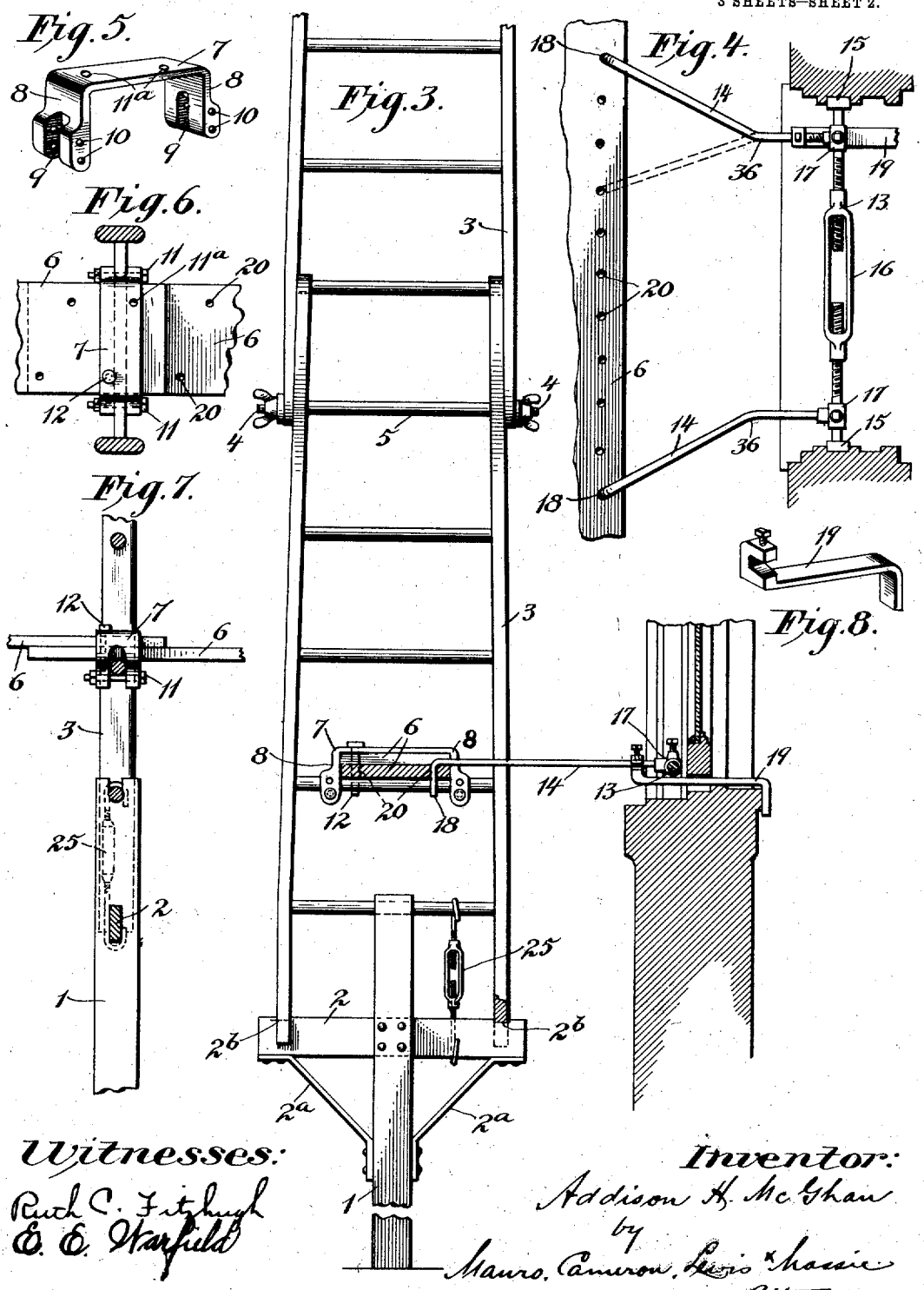
Witnesses:
Ruth C. Fitzhugh
E. E. Warfield
Inventor:
Addison H. McGhan
by
Mauro, Cameron, Lewis & Massie
Attys.

A. H. McGHAN.

PORTABLE SCAFFOLD.

APPLICATION FILED JULY 15, 1911.

Reissued Aug. 15, 1911.

13,281.

3 SHEETS—SHEET 3.

Witnesses:

Ruth C. Fitzhugh.

E. E. Warfield

Inventor:

Addison H. McGhan, by

Mauro, Cameron, Lewis & Massie,

Attys.

UNITED STATES PATENT OFFICE.

ADDISON H. McGHAN, OF WASHINGTON, DISTRICT OF COLUMBIA, ASSIGNOR TO THE McGHAN PATENT SCAFFOLDING COMPANY, OF WILMINGTON, DELAWARE, A CORPORATION OF DELAWARE.

PORTABLE SCAFFOLD.

13,281. Specification of Reissued Letters Patent. Reissued Aug. 15, 1911.

Original No. 974,686, dated November 1, 1910, Serial No. 568,516. Continuation of application filed March 9, 1910, Serial No. 548,394. Application for reissue filed July 15, 1911. Serial No. 638,788.

*To all whom it may concern:*

Be it known that I, ADDISON H. McGHAN, of Washington, District of Columbia, have invented a new and useful Improvement in Portable Scaffolds, which invention is fully set forth in the following specification.

My invention relates to improvements in portable scaffolds for exterior or interior work, and my principal objects are the provision of an inexpensive, rigid, strong and safe scaffold adaptable to widely differing conditions, forms of walls, etc., and constructed of a minimum number of parts capable of being quickly put together and taken apart by laborers or workmen of most ordinary intelligence.

The novel and distinctive characteristics of the invention by which these objects are accomplished may be most readily understood from the following description, referring to the accompanying drawings, wherein—

Figure 1:
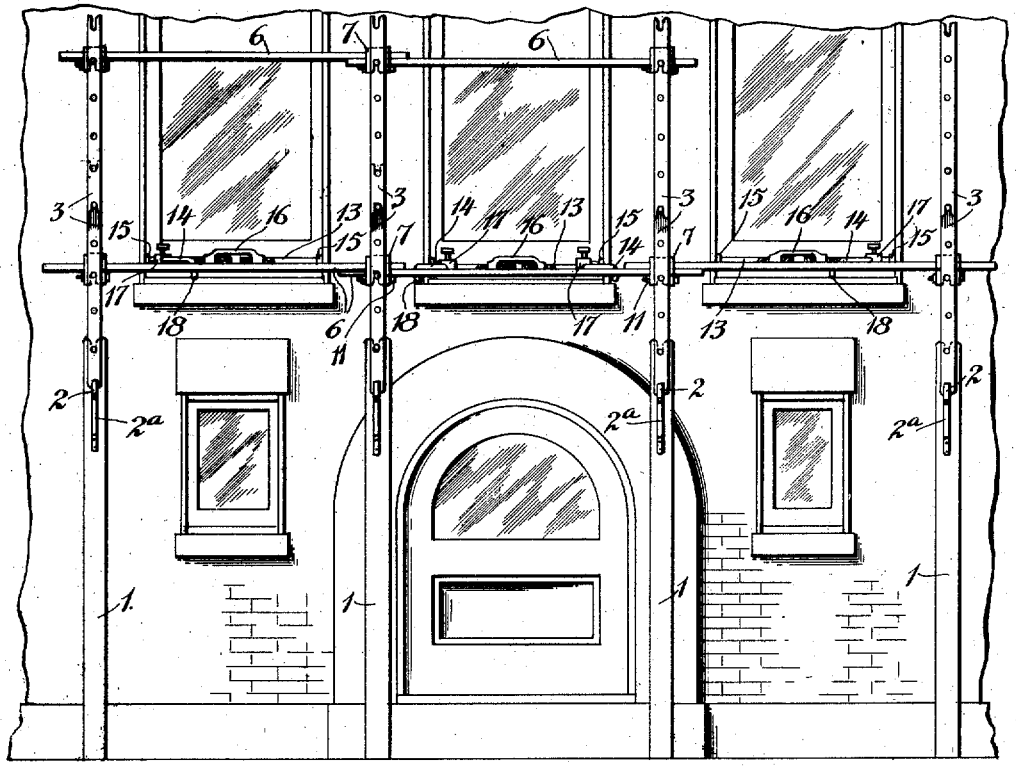
Figure 2:
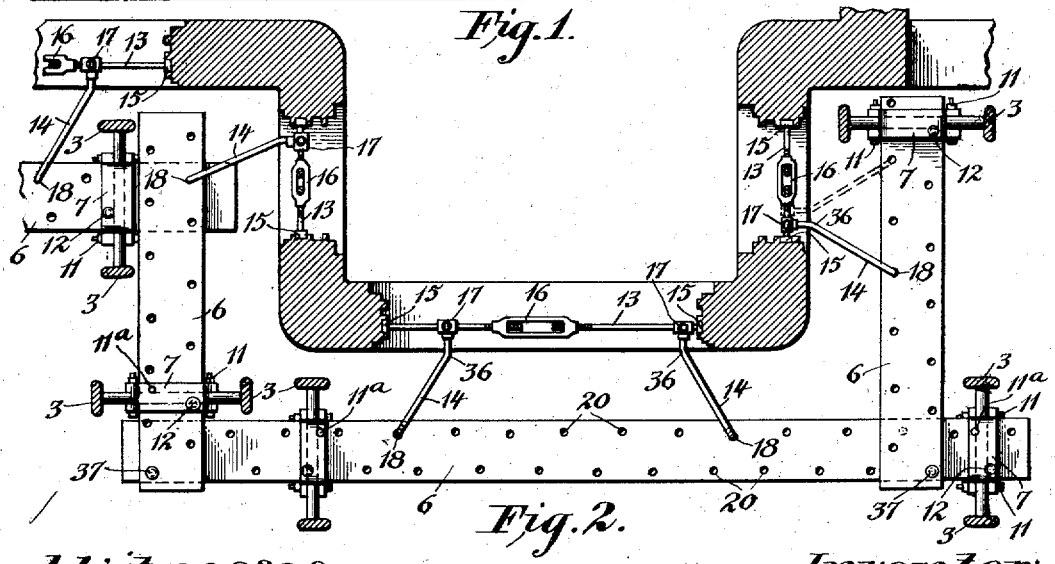
Figure 9:
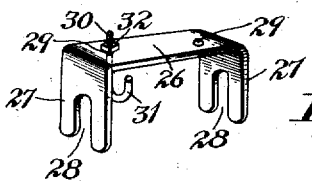
Figure 10:
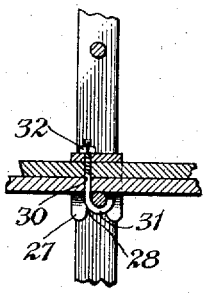
Figure 11:
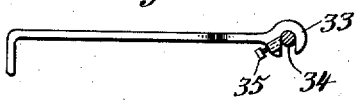
Figure 12:
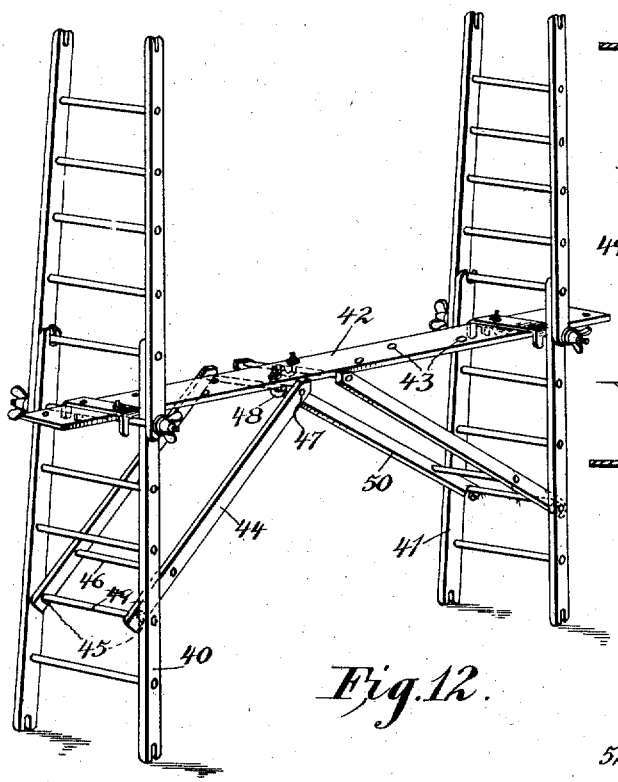
Figure 13:
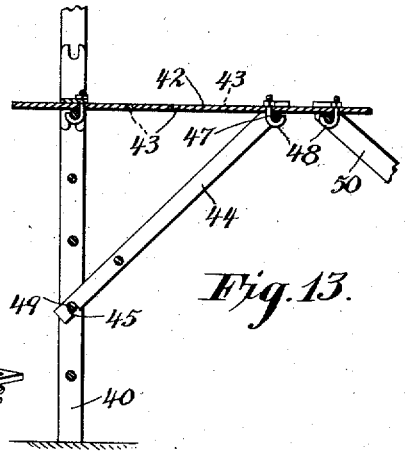
Figure 14:
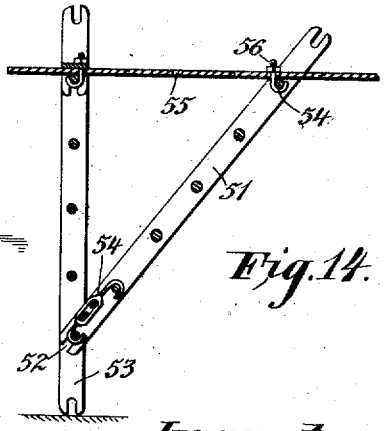

Figure 1 is a view in elevation showing the scaffold applied to the front of a building; Fig. 2 is a view in plan showing its application to a wall having a projection, in the present instance a bay-window; Fig. 3 is a view in end elevation of a scaffold upright showing the manner of connecting the scaffold to a window-frame; Fig. 4 is a view in plan showing the means for fastening the scaffold to a window-frame; Fig. 5 is a view in perspective of the clamp for securing the platform-boards to rungs of the uprights; Fig. 6 is a view in plan, partly in section, and Fig. 7 is a view in side elevation with the upright being in section showing overlapping ends of two scaffold-boards secured to a rung of an upright; Fig. 8 is a view in perspective of an attachment for connecting the braces to the window-sill; Fig. 9 is a view in perspective of another form of clamp for securing the platform-boards to the rungs of the uprights; Fig. 10 is a view in vertical section showing the clamp of Fig. 9 used to connect overlapping ends of two boards to a rung of an upright; Fig. 11 is a detail view of a slightly different form of brace from that shown in the previous figures; Fig. 12 is a perspective view illustrating supporting braces to the middle of a platform-board supported at its ends on rungs of ladder uprights; Fig. 13 is a vertical sectional view through one end of the structure shown in Fig. 12; and Fig. 14 is a view similar to Fig. 13 showing the use of a ladder section or unit as a brace.

The scaffold of Figs. 1 to 7 comprises a series of sectional uprights, the lower section of each of which consists of a single stile or standard 1, preferably made of wood, and provided near its upper end with a cross-head 2, the latter being supported at its ends by braces $2^a$ and having in its upper edge two notches $2^b$, $2^b$. These sections 1 of the uprights rest on the ground, pavement, or other supporting surface, as the case may be, and carry or support the upper sections 3, which latter are in the form of ladder sections of comparatively short lengths so that they may be readily and easily handled by one man. I find it convenient to employ interchangeable and interlocking ladder sections of the character illustrated, which are obtainable upon the market. The side members or bars of the ladder sections 3 converge slightly upwardly as shown in Fig. 3, so as to permit the upper end of each section to enter between the side members of the ladder section next above. The ladder sections 3 are of the same size and hence are interchangeable. They are each provided at the lower ends of their side bars with slots which receive the cross-head 2 of the base section 1, or the projecting ends 4 of the top rung 5 of the next lower ladder section 3. The lowermost ladder section in each upright rests on the cross-head 2 of the base section 1 with the slots at the lower ends of the side bars of said ladder section fitting about the cross-head 2 in the notches $2^b$, $2^b$, respectively, thereby preventing said lower section from shifting its position along the cross-head. Furthermore, the lower rung of this lowermost ladder section is seated in a recess or notch in the top of the base member 1, as clearly shown in Figs. 3 and 7, while the upper ladder sections are each supported by interlocking with the ladder section next below. A turn-buckle 25 having hooked ends engaging respectively the cross-head 2 and the lower rung of the ladder section 3 above, holds these parts in interlocking engagement. By thus making the lower sections of these uprights in the form of a single standard or stile, I obtain a number of advantages. For example, where they rest upon a sidewalk they present less obstruction than would ladder sections; they cannot be easily climbed by children, or by others who may wish to use the scaffold as a means of access to the house through upper windows; they may stand in area-ways, between church pews, or in other restricted spaces which would not accommodate ladder sections. But, obviously, for many locations and uses of the scaffold, ladder sections may be used in place of these lower single stile sections or supports.

In erecting or assembling the scaffold, two uprights, each consisting of a single stile section 1 having a ladder section 3 fixed thereon in the manner described, are arranged in vertical position and connected by a scaffold or platform-board 6 which rests upon a supporting rung of the ladder section of each upright, and is fastened to each of said rungs by a clamp 7. This clamp 7 is a strap or bar extending across the board and having downwardly bent ends 8, 8, which closely engage the side edges of the board and are slotted or forked at 9 to receive and straddle the rung at or near the opposite edges of the board. By this engagement of the ends 8, 8, with the edges of the board and the ladder rung, turning or pivotal movement of the upright with relation to the platform-board is prevented. Each end 8 of the clamp 7 has two holes 10, 10, for receiving bolts 11 which pass under the rung, as shown in Fig. 7. When a clamp 7 is used to embrace and fasten a single platform-board to a rung, bolts 11, 11, are passed through the upper of the two openings 10 in each of the ends 8 of the clamp; but where the clamp embraces and fastens overlapping ends of two platform-boards, as illustrated in Fig. 7, the bolts 11 pass through the lower holes 10; or, if desired, two clamps of different dimensions may be employed, one for use with a single board and the other for use with overlapping boards. In either case, the clamps are provided with two holes $11^a$, $11^a$, one of which is adapted to be brought into register with one of a series of holes 20 in a platform board, or with two such openings 20 in overlapping ends of two platform-boards, and a bolt 12 passes through the registering holes to lock the platform-board, or boards, against endwise movement or displacement.

Figs. 9 and 10 illustrate a somewhat different form of clamp from that of the previous figures; it comprises a strap or bar 26 extending across the platform-board and having downwardly bent ends 27, 27, adapted to closely engage the side edges of the board, and slotted or forked at 28 to receive and straddle the rung, as in the construction before described. This clamp also has two holes 29, 29, either one of which is adapted to be brought into register with one of the holes 20 of the platform-board, or with two such holes in overlapping ends of two boards, as shown in Fig. 10. A bolt 30 adapted to be passed upward through the registering openings has at its lower end a hook 31 adapted to engage about the ladder rung and at its upper end is screw-threaded and carries a clamp nut 32 for drawing and holding the parts tightly together. This nut may be shaped for engagement of a wrench, or may have wings thereon to be gripped and turned by hand. It will be noted that in this construction of the clamp the single bolt 30 serves the purpose of the three bolts 11, 11 and 12, and also dispenses with the provision of the openings 10 in the construction of clamp first described. The bolt or pin 30 therefore not only passes through a hole in the board, but as a means for fastening the board to the rung there is a hook on the end of the bolt or pin embracing the rung. By thus connecting the platform-boards to the rungs by the clamps the boards may project at either or both ends beyond the uprights and be supported against the possibility of tipping under the weight of a workman. Furthermore, these clamps closely embracing the board and secured to the rungs operate to tie the structure as a whole and prevent lateral swaying and also turning movement of the uprights which latter is most apt to occur when lower single stile supports are used.

After the first platform-board has been placed in position on the two uprights and before or after it has been clamped to the latter, it is secured to a window-frame, as shown in Fig. 4, by the window struts 13 and the braces 14. Each strut consists of two rods or sections; a bearing plate 15 at the outer end of each rod is adapted to rest in the window-frame between the beads for the upper sash. The inner ends of the rods are screw-threaded and connected by a turn-buckle 16. The rods or sections and the turn-buckle are of such size as to permit of a wide range of adjustment thereby adapting the struts to windows of varying widths. Some other suitable form of window-strut might be used. As illustrated in Figs. 1 to 4 the braces 14 are each provided with a sleeve 17 slidably mounted on the strut rods, each sleeve carrying a set-screw or bolt by which it can be locked to the strut. What is now believed to be a preferable and more convenient form of brace is shown in Fig. 11; instead of having a sleeve or circular opening at its inner end into which a rod of the window-strut must be passed before the strut is put in place, the brace of Fig. 11 has an opening or recess in the form of a hook 33 at its inner end adapted to be engaged about a rod 34 of the strut after the latter has been put in place, and a set screw or bolt 35 adapted to be tightened against rod 34 to lock the parts in engagement. The screw or bolt 35 may, if desired, have a winged head for turning by hand. Figs. 3, 4 and 8, illustrate, as an additional means of securing braces 14 in place, a hooked attachment 19 adjustably secured to the brace and engaging the inner face of the window-sill.

As illustrated in Figs. 2 and 4, the braces 14 are bent between their ends at 36, the bend in some braces being in one direction and in other braces in the opposite direction. This renders the bracing more effective in eliminating parallelism between braces, the presence of which would to some extent sacrifice rigidity of bracing. At their outer extremities the braces 14 are bent at right angles to provide depending hooked ends 18 to engage downward through one of the holes 20 of a platform-board. The hole 20 thus engaged may be in the row of holes nearest the building, or in the row of holes at the outer edge of the board farthest from the building, according to whether it is desired to position the scaffold nearer to or farther from the wall. This, in some instances, is determined by cornices, ledges and other projections from the wall of the building which must be cleared by the scaffold.

The holes 20 in the platform-board are very important. As already explained, they serve to receive a bolt of each fastening means or clamp by which a board is secured to a supporting rung, and to be engaged by the hooked ends 18 of the braces 14; they also serve as guides in putting successive boards in place, as explained later. As illustrated, each board has a series of these holes 20 extending lengthwise thereof and arranged in two rows positioned, respectively, near the opposite edges of the board. The holes in each row are equi-distant and the distance between holes in one row is the same as in the other row. Furthermore, the holes are staggered; that is to say, the holes of one row are located between the holes of the other row, so that a line drawn across a board through a hole of one row will pass midway between two holes of the other row. In practice, with boards twelve inches wide, I have placed the holes in each row six inches apart from center to center and the rows of holes three inches in from the edges of the board. The holes 20 are similarly positioned in all of the platform-boards, from which it follows that the distance between any two widely separated holes used for clamps 7 of one board is the same as that between two corresponding openings used for clamps 7 of another board.

Two uprights having been positioned and connected by a platform-board, as before explained, the workmen next put in place a window-strut 13 and two braces 14, as shown in Fig. 4. With this much of the scaffold thus securely fastened to the building and braced against endwise movement, one or more workmen standing on the platform-board may add other ladder sections 3 to the uprights and connect other platform-boards between such added ladder sections at elevations above the first board put in place, these added ladder sections and boards being most conveniently passed up from below or drawn up by means of rope, with the assistance of another workman upon the ground. In thus putting a second board (and still others) in position above the first board, the workman has only to make sure to pass the bolts of the clamping devices 7 which secure the second board to its supporting rungs through holes 20 corresponding in position to the holes that were used for the clamping devices of the first or lower board. The holes thus serve as guides, eliminating the necessity of making troublesome measurements, assuring exact parallelism of the neighboring uprights and trueness and accuracy in assembling the parts, all of which are particularly essential where the scaffold is to be carried up to a considerable height, and effecting a symmetrical disposition of the parts which facilitates erection and in the finished scaffold (particularly large scaffolds of many uprights) assures equal and proper distribution of load and avoids undue strains upon individual parts.

Any number of uprights may be used and the scaffold erected to plain walls and walls having projections; Fig. 1 shows a scaffold having four uprights erected in front of a building having a plain wall, while Fig. 2 shows a scaffold having five or more uprights erected around a bay-window. In Fig. 1 the lower level of scaffold boards overlap at intermediate uprights and the overlapping ends are fastened to supporting rungs in the manner shown in Fig. 7. In Fig. 2, overlapping ends of some of the boards are fastened together by bolts or pins 37, 37, passing through registering holes 20 of the two boards, while in one instance (at the upper left hand end of Fig. 2) the overlapping ends are fastened together by passing the hooked end 18 of a brace 14 through registering openings 20 in both boards. It is thus apparent that the several parts of the scaffold are constructed and arranged for use with any shape of wall or front and adapted to position the boards within easy working distance of the wall; the parts can be assembled in erecting the scaffold and taken apart in disassembling the same without necessarily entering the building and without defacing or injuring the window-frames to which the struts are fastened or any other part of the building. In disassembling the scaffold, the workmen begin at the top, first removing the braces, struts, and clamps of the upper boards, then said boards themselves, then the uppermost ladder sections of the uprights, and so on down.

It is important to note that by connecting the braces 14 to the platform-boards the number and positioning of uprights is not restricted by the number and location of window-openings: the uprights may be positioned irrespective of such openings and in such manner as to secure and maintain the before-mentioned symmetrical disposition of the parts. It is, therefore, apparent that from a minimum number of parts, without making measurements, without marring or injuring a building, and (for an exterior scaffold) without entering the building, a strong and safe scaffold may be erected in a very short time by laborers of most ordinary intelligence at minimum expense; and that the same parts are adapted to the ready construction of scaffolds, erected to conform to widely different wall structures and conditions.

Where the platform-boards are called upon to support unusual weight, such as a number of workmen on a single board, or in addition to the weight of a workman the weight of heavy materials, such as brick, it may be found desirable to relieve the strain upon the board and upon the rungs upon which it rests by the provision of means for also supporting the board at one or more points intermediate of the uprights between which it extends. I have illustrated such means in Figs. 12 and 13, wherein 40 and 41 are two ladder uprights resting upon the ground, or they may be parts of uprights having lower single stile supports, as in Figs. 1 and 3. A platform board 42, having therein holes 43 (the same as holes 20 before described) extends between the ladder uprights and is fastened to its supporting rungs by clamps such as shown in Fig. 9, the bolt of each clamp passing through one of the holes 43 in the board. 44 is an obliquely positioned brace consisting of two side bars each notched at 45 near one end to hook over a rung 49 of the ladder upright 40; a rung 46 connects the side bars near one end and a rung 47 connects them near the other end and crosses under the board near its middle or intermediate of the uprights. A hooked bolt 48 (similar to the hooked bolt 30 of Figs. 9 and 10) embraces the rung 47, and passes through one of the holes 43 of the board to securely fasten the board and rung together. The brace 44 therefore not only provides an additional support for the board, but relieves the rung of ladder upright 40 upon which the board rests by throwing some of the burden upon another rung 49. The brace 44 is of such dimensions with relation to the positioning of the holes 43 in the board and of the rungs of the upright as to form an approximate right-angle between the board and the upright. The brace may be engaged with a rung above or below rung 49, and the bolt 48 engaged with a corresponding hole 43, the right-angle relationship between the board and upright being still maintained. Figs. 12 and 13 show another brace 50, similar to brace 44, extending from ladder upright 41 to the board.

Instead of providing a special construction of brace, such as 44 and 50, I may use for this purpose one of the ladder units or sections, like those used in the uprights; but ladder sections used for this purpose are less desirable because they project above the board presenting obstructions in the way of workmen. As shown in Fig. 14, 51 is a brace consisting of a ladder section or unit having the slotted ends of its side bars engaged with a rung 52 of a ladder upright 53 and locked in such engagement by a turnbuckle connection 54. The rung 57 at the other end of the brace 51 crosses under the board 55 and is fastened thereto by a hooked bolt 56 passing through one of the holes in the board. The dimensions of the parts, positioning of the rungs and of the holes in the platform-board, are such as to give a right-angle between the board and upright.

It is evident that many slight changes might be resorted to in the relative arrangement of parts shown and described herein, without departing from the spirit and scope of my invention, hence I would have it understood that I do not wish to confine myself to the exact construction and arrangement of parts shown and described.

Furthermore, while I have herein illustrated and described with particularity the uprights as being composed, in whole or in part, of ladder sections of a type obtainable upon the market, and while I find it most convenient and economical for many uses of the scaffold to employ uprights so constructed, it is to be understood that I may employ other suitable forms of uprights having approximately horizontal members or rungs for supporting the platform boards.

The present application is a continuation of and substitute for my application Serial No. 548,394, filed March 9th, 1910 (which earlier application is to be abandoned) as to all subject-matter common of the two.

What is claimed is:—

1. A scaffold comprising spaced, parallel vertical standards formed of lower single stile supports and upper opposed ladder sections, in combination with floor boards, means for rigidly connecting them to said ladders to hold the vertical standards parallel and prevent lateral swaying or pivotal movement thereof, and means to connect said boards intermediate the standards rigidly to the opposed inner faces of window frames.

2. The combination with uprights and a scaffold board carried thereby and provided with holes near its edge, of an extensible strut for attachment to a window frame, and two braces adjustably mounted on said strut and having bent ends to engage holes in the scaffold board.

3. The combination with uprights and a scaffold board carried thereby, the said board having a series of holes arranged along its edge, of an extensible strut for attachment to a window frame, two braces movably mounted on said strut and having bent ends to engage the holes in the scaffold board and means for locking the braces to the strut.

4. In a scaffold, the combination with upright ladder members, a scaffold board resting on rungs of said ladder members and braces for connecting the board to a building, of clamps embracing the board adjacent each upright member, each clamp having a slotted end to straddle a rung of a ladder section, and means for locking the clamp to its rung.

5. In a scaffold, the combination with upright ladder members, a scaffold board resting on rungs of said ladder members and braces for connecting the board to the building, of clamps embracing the board adjacent to each upright member each clamp having a slotted end to straddle a rung of a ladder section, and a bolt passing through each clamp and the scaffold board.

6. In a scaffold, the combination of two approximately parallel uprights; one or more platform-boards supported by approximately horizontal members of the uprights; means for fastening the platform-board or boards to each of their supporting members thereby securing the boards against endwise movement on said members and the uprights at a fixed distance apart; and braces extending from said platform-board or boards and fastened to a building or other structure.

7. In a scaffold, the combination of two approximately parallel uprights; one or more platform-boards each having therethrough a series of holes extending lengthwise thereof and supported by approximately horizontal members of the uprights; means for fastening the platform-board or boards to each of their supporting members, thereby securing the boards against endwise movement on said members and the uprights at a fixed distance apart; and braces each connected to a platform-board by means engaging one of said holes and fastened to a building or other structure.

8. In a scaffold, the combination of two approximately parallel uprights including opposed ladder sections, there being one or more such ladder sections in each upright; platform-boards each having therethrough a series of holes extending lengthwise thereof and supported by rungs of opposed ladder sections; means for fastening the platform-boards to each of their supporting rungs, thereby securing the boards against endwise movement on said rungs and the uprights at a fixed distance apart; said means including at each supporting rung a strap extending across the board and embracing said rung, and a bolt or pin passing through said strap and one of said openings in the board; and braces each connected to a platform-board by means engaging one of said holes and fastened to a building or other structure.

9. In a scaffold, the combination of two approximately parallel uprights; one or more platform-boards supported by approximately horizontal members of the uprights; means for fastening the platform-board or boards to each of their supporting members, thereby securing the boards against endwise movement on said members and the uprights at a fixed distance apart; window struts engaging the frames of windows of a building; and braces extending from said window struts and connected to said platform-board or boards.

10. In a scaffold, the combination of two approximately parallel uprights including opposed ladder sections, there being one or more such ladder sections in each upright; one or more platform-boards supported by rungs of opposed ladder sections; means for fastening the platform board or boards to each of their supporting rungs, thereby securing the boards against endwise movement on said rungs and the uprights at a fixed distance apart; window struts engaging the frames of windows of a building; and braces each fastened at one end to a platform-board and at its other end having a hook engaging over a bar of its corresponding window strut and means for locking said hook in engagement with said bar.

11. In a scaffold, the combination of two approximately parallel uprights including opposed ladder sections, there being one or more such ladder sections in each upright; one or more platform-boards each having therethrough a series of holes extending lengthwise thereof and supported by rungs of opposed ladder sections; means for fastening the platform-board or boards to each of their supporting rungs, thereby securing the boards against endwise movement on said rungs and the uprights at a fixed distance apart; window struts engaging the frames of windows of a building; and braces each fixed at its inner end to a window strut and having a laterally bent outer end engaging one of said holes through a platform-board.

12. In a scaffold, the combination of two approximately parallel uprights including opposed ladder sections, there being one or more such ladder sections in each upright; one or more platform-boards each having therethrough two rows of holes extending lengthwise thereof, and supported by rungs of opposed ladder sections; means for fastening the platform-board or boards to each of their supporting rungs, thereby securing said boards against endwise movement on said rungs and the uprights at a fixed distance apart; window struts engaging the frames of windows of a building; and braces each fixed at its inner end to a window strut and having a laterally bent outer end engaging one of said holes through a platform-board.

13. In a scaffold, the combination of two approximately parallel uprights including opposed ladder sections, there being one or more such ladder sections in each upright; one or more platform-boards each having therethrough a series of holes extending lengthwise thereof, and supported by rungs of opposed ladder sections; fastenings for securing each platform-board to its supporting rungs, the fastenings at each rung including a strap extending across the board and having ends extending across the opposite edges of the board, each end also embracing the ladder rung, and a pin or bolt passing through said strap and into one of said holes through the board; and braces extending from said platform-board or boards and fastened to a building or other structure.

14. In a scaffold, the combination of two approximately parallel uprights including opposed ladder sections, there being one or more such ladder sections in each upright; one or more platform-boards each having therethrough a series of holes extending lengthwise thereof, and supported by rungs of opposed ladder sections; fastenings for securing each platform-board to its supporting rungs, the fastening at each rung including a strap extending across the board and having ends extending across the opposite edges of the board, each end also embracing the ladder rung, and a pin or bolt passing through said strap and into one of said holes through the board; and braces each connected to a platform-board by means engaging one of the holes and fastened to a building or other structure.

15. In a scaffold, the combination of three approximately parallel uprights including opposed ladder sections, there being one or more such ladder sections in each upright; a plurality of platform-boards each having therethrough a series of holes extending lengthwise thereof, and supported by rungs of opposed ladder sections; two of such boards overlapping each other at a supporting rung of a ladder section of the intermediate upright; means for fastening each platform-board to each of its supporting rungs, said means including at each supporting rung a strap extending across the board and embracing the rung, and a bolt or pin passing through said strap and one of said holes in the board, and where the boards overlap through two of said holes in the overlapping ends; and braces each connected to a platform-board by means engaging one of said holes and fastened to a building or other structure.

16. In a scaffold, the combination of two approximately parallel uprights; one or more platform-boards supported by approximately horizontal members of the uprights; bolts, one passing through each platform-board at each of its supporting members, said bolt having at one end a hook embracing the supporting member and at its other end a screw-thread engaged by a clamping nut; and braces extending from said platform-board or boards and fastened to a building or other structure.

17. In a scaffold, the combination of an upright; a platform-board supported by an approximately horizontal member of said upright; and a fastening for securing said board to said member comprising a strap extending across said board embracing the opposite edges thereof and notched or forked to straddle the member near each edge of the board; and a bolt or pin passing through said strap and the board.

18. In a scaffold, the combination of an upright; a platform-board supported by an approximately horizontal member of said upright; and a fastening for securing said board to said supporting member comprising a strap extending across said board embracing the opposite edges thereof and notched or forked to straddle the supporting member near each edge of the board; and a bolt passing through said strap and board, said bolt having at one end a hook embracing the supporting member, and at its other end a screw-thread engaged by a clamping nut.

19. In a scaffold, the combination of two approximately parallel uprights including opposed ladder sections, there being one or more such ladder sections in each upright; two platform-boards extending between said uprights at different elevations, each board being supported by rungs of opposed ladder sections and having therethrough a series of holes extending lengthwise thereof, the holes in each board being similarly positioned with relation to the holes in the other board; and means for fastening the platform-boards to each of their supporting rungs, said means having at each supporting rung a bolt or pin passing through one of said holes of the board, the bolts or pins for one board passing through holes in said board corresponding in position to the holes through which the bolts or pins for the other board pass.

20. In a scaffold, the combination of two approximately parallel uprights; two platform-boards extending between said uprights at different elevations, each board being supported by approximately horizontal members of the uprights and having therethrough a series of holes extending lengthwise thereof; and means for fastening the platform-boards to each of their supporting members, said means having at each supporting member a bolt or pin passing through one of said holes of the board, the bolts or pins for one board passing through holes which are the same distance apart as are the holes through which the bolts or pins for the other board pass.

21. In a scaffold, the combination of two approximately parallel uprights including opposed ladder sections, there being one or more such ladder sections in each upright; two platform-boards extending between said uprights at different elevations, each board being supported by rungs of opposed ladder sections and having therethrough a series of equidistant holes extending lengthwise thereof, the distance between the holes being the same for both boards; and means for fastening the platform-boards to each of their supporting rungs, said means having at each supporting rung a bolt or pin passing through one of said holes of the board, the bolts or pins for one board passing through holes corresponding in position to the holes through which the bolts or pins for the other board pass.

22. In a scaffold, the combination of two approximately parallel uprights; two platform boards extending between said uprights at different elevations, each board being supported by approximately horizontal members of the uprights and having therethrough a series of equidistant holes extending lengthwise thereof, the distance between the holes being the same for both boards; means for fastening the platform-boards to each of their supporting members, said means having at each supporting member a bolt or pin passing through one of said holes of the board, the bolts or pins for one board passing through holes corresponding in position to the holes through which the bolts or pins for the other board pass; and braces fastened to a building or other structure and connected to said platform-boards by means engaging said holes.

In testimony whereof, I have signed this specification in the presence of two subscribing witnesses.

ADDISON H. McGHAN.

Witnesses:
W. B. KERKAM,
R. C. FITZHUGH.

Copies of this patent may be obtained for five cents each, by addressing the "Commissioner of Patents, Washington, D. C."